(12) United States Patent
Yamazaki et al.

(10) Patent No.: US 8,071,909 B2
(45) Date of Patent: Dec. 6, 2011

(54) THREE-DIMENSIONAL LASER BEAM MACHINING APPARATUS FOR LONG WORKPIECE

(76) Inventors: Tsunehiko Yamazaki, Aichi pref. (JP); Naoomi Miyakawa, Aichi pref. (JP)

( * ) Notice: Subject to any disclaimer, the term of this patent is extended or adjusted under 35 U.S.C. 154(b) by 846 days.

(21) Appl. No.: 12/132,017

(22) Filed: Jun. 3, 2008

(65) Prior Publication Data

US 2008/0302769 A1     Dec. 11, 2008

(30) Foreign Application Priority Data

Jun. 6, 2007   (JP) ................................. 2007-150407

(51) Int. Cl.
*B23K 26/00*     (2006.01)
*B23K 26/08*     (2006.01)

(52) U.S. Cl. .................. 219/121.67; 219/121.82; 83/78; 29/33 T

(58) Field of Classification Search ............ 219/121.63–121.72, 121.82; 83/78; 29/33 T
See application file for complete search history.

(56) References Cited

U.S. PATENT DOCUMENTS

| | | | |
|---|---|---|---|
| 3,447,707 A | | 6/1969 | Furst |
| 3,720,992 A | * | 3/1973 | Hyatt ............................... 29/430 |
| 3,837,469 A | | 9/1974 | Kihnke |
| 4,591,294 A | | 5/1986 | Foulkes |
| 5,373,136 A | * | 12/1994 | Ernst et al. ............... 219/121.67 |
| 6,483,075 B1 | | 11/2002 | Yamazaki et al. |
| 7,005,604 B2 | * | 2/2006 | Dietrich et al. .......... 219/121.71 |
| 7,649,155 B2 | * | 1/2010 | Yamazaki et al. ....... 219/121.71 |

FOREIGN PATENT DOCUMENTS

| | | |
|---|---|---|
| DE | 197 21 330 C2 | 11/1997 |
| DE | 197 21 331 C2 | 11/1997 |
| DE | 198 38 863 A1 | 3/1999 |
| EP | 0 481 462 B1 | 4/1992 |
| EP | 0 705 655 A1 | 4/1996 |
| JP | 2001-353584 | 12/2001 |
| JP | 3769663 | 2/2002 |
| JP | 3710116 | 8/2005 |
| JP | 3796079 | 4/2006 |

OTHER PUBLICATIONS

Japanese Office Action dated Jan. 6, 2009 for corresponding Janpanese application No. 2007-150407.
Extended European Search Report from corresponding European Application No. 08405127.5 dated Sep. 30, 2008.

* cited by examiner

*Primary Examiner* — Samuel M Heinrich
(74) *Attorney, Agent, or Firm* — Renner, Otto, Boisselle & Sklar, LLP

(57) ABSTRACT

There is provided a three-dimensional laser beam machining apparatus for a long workpiece, which includes an automatic loading device for a large variety of materials that feeds materials to a three-dimensional laser beam machine. The automatic loading device 100 for a large variety of materials has a bundle type material loading device 120. A bundle type material $W_1$ is a round pipe or a polygonal pipe, and the posture thereof around the axis line is aligned automatically when the material is conveyed by a roller conveyor 140. The front material stopped by a stopper 150 is sent out to an inclined conveyor 180 over the stopper 150 by means of a swing arm 170. The bundle type material as well as a versatile type material, the posture of which around the axis line is not aligned automatically, are set on a receiving member 210 of a common conveyor 200 and sent to the three-dimensional laser beam machine by the operator.

3 Claims, 4 Drawing Sheets

THREE-DIMENSIONAL LASER BEAM MACHINING APPARATUS FOR LONG WORKPIECE

The present application is based on and claims priority of Japanese patent application No. 2007-150407 filed on Jun. 6, 2007, the entire contents of which are hereby incorporated by reference.

BACKGROUND OF THE INVENTION

1. Field of the Invention

The present invention relates to a three-dimensional laser beam machining apparatus capable of linearly cutting a so-called long material, such as a pipe and an angle bar, into a free curved shape with laser beams.

2. Description of the Related Art

In recent years, a linear machining apparatus capable of cutting a long workpiece has been proposed. Japanese Patent No. 3769663, Japanese Patent No. 3710116, and Japanese Patent No. 3796079 relate to three-dimensional laser beam machining apparatuses for a long material, the patents of which are held by the applicant of the present invention.

Also, DE19838863A1, DE19721330C2, DE19721331A1, and EP0481462B1 disclose similar machining apparatuses.

These three-dimensional laser beam machining apparatuses require a device for automatically feeding long materials.

The three-dimensional laser beam machining apparatus, which machines long materials having various cross-sectional shapes, requires a loading device capable of loading materials having various cross-sectional shapes.

For the materials having various cross-sectional shapes, such as round pipes and polygonal pipes, the postures thereof around the axis lines are made coincide automatically during the conveyance of materials.

Of these materials, small-size long materials, which are called bundle type materials, are supplied in a bundled state in large quantities.

On the other hand, large, long materials, for example, each having an L-shaped cross section or an H-shaped cross section, which are called versatile type materials, must be set on the loading device one by one with the postures thereof around the axis line aligned.

SUMMARY OF THE INVENTION

An object of the present invention is to provide a three-dimensional laser beam machining apparatus provided with a loading device capable of loading bundle type long materials that are supplied in large quantities at a time and versatile type long materials that are supplied one by one.

To achieve the above object, the three-dimensional laser beam machining apparatus for a long workpiece in accordance with the present invention includes a base disposed in the lengthwise direction, a three-dimensional laser beam machine disposed in the central part of the base, and an automatic loading device for a large variety of materials and a device for unloading a machined workpiece, which are disposed with the three-dimensional laser beam machine being held therebetween.

The automatic loading device for a large variety of materials includes a device for loading a first type material which has a cross-sectional shape such that the posture around the axis line is aligned automatically during the conveyance and is supplied in a bundle form, and an inclined conveyor for aligning the first type materials in a line and sending them to a common conveyor, the common conveyor being provided with a receiving member which is used commonly for the first type material and a second type material which has a cross-sectional shape such that the posture around the axis line is not aligned automatically during the conveyance.

The common conveyor is provided with several receiving members that move in the horizontal direction.

The first type material is a round pipe or a polygonal pipe.

The automatic loading device for a large variety of materials includes a conveyor for sending the first type material in the horizontal direction; a stopper for regulating the forefront position of the sent first type material, a two-tier stack preventive device which is disposed on the upstream side of the stopper to prevent the sent first type material from being stacked in two or more tiers; and a swing arm for sending out a front material one by one over the stopper.

Also, the automatic loading device for a large variety of materials includes a means for adjusting the horizontal position of the stopper and the height position of the two-tier stack preventive device.

Further, the three-dimensional laser beam machining apparatus for a long workpiece further includes a first rotary chuck provided in the three-dimensional laser beam machine and a second rotary chuck which is disposed on the feed side to hold the long material, and still further includes a driving unit for driving the second rotary chuck and two third rotary chucks, which are disposed on the delivery side, in the axis line direction.

According to the three-dimensional laser beam machining apparatus in accordance with the present invention, various types of long materials can be fed automatically, so that the machining efficiency can be improved.

DETAILED DESCRIPTION OF THE PREFERRED EMBODIMENTS

Figure 1:
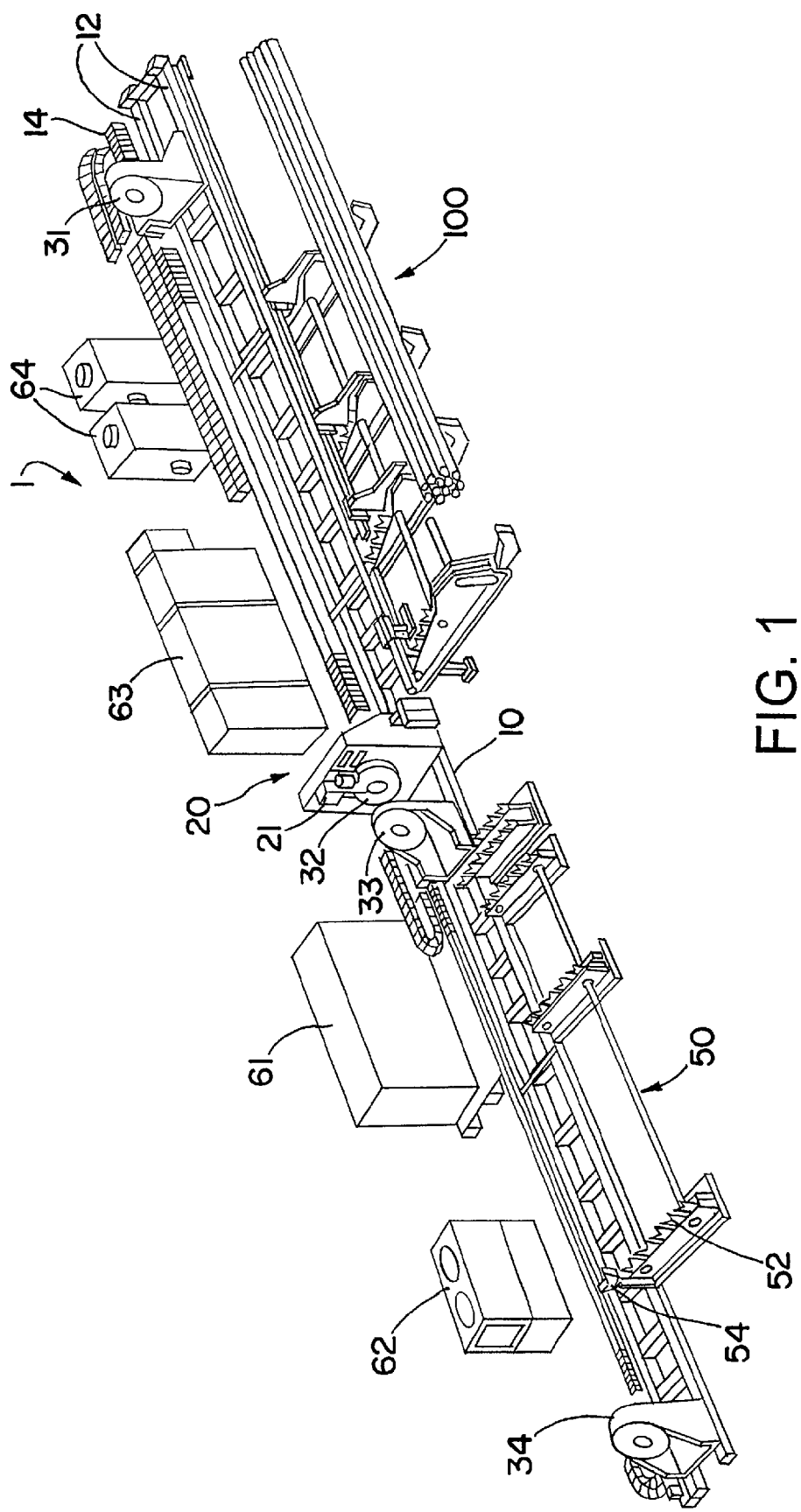
FIG. 1 is a perspective view showing a three-dimensional laser beam machining apparatus in accordance with an embodiment of the present invention.
Figure 2:
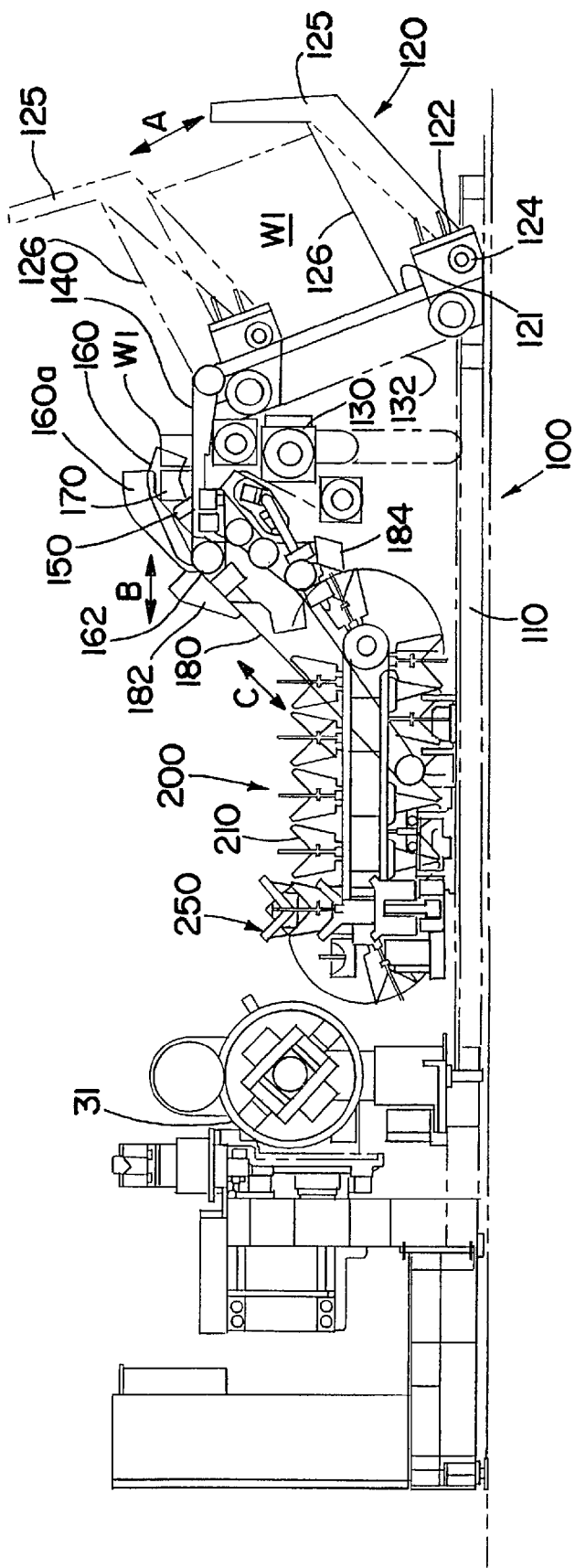
FIG. 2 is a front view of an automatic loading device for a large variety of materials.
Figure 3:
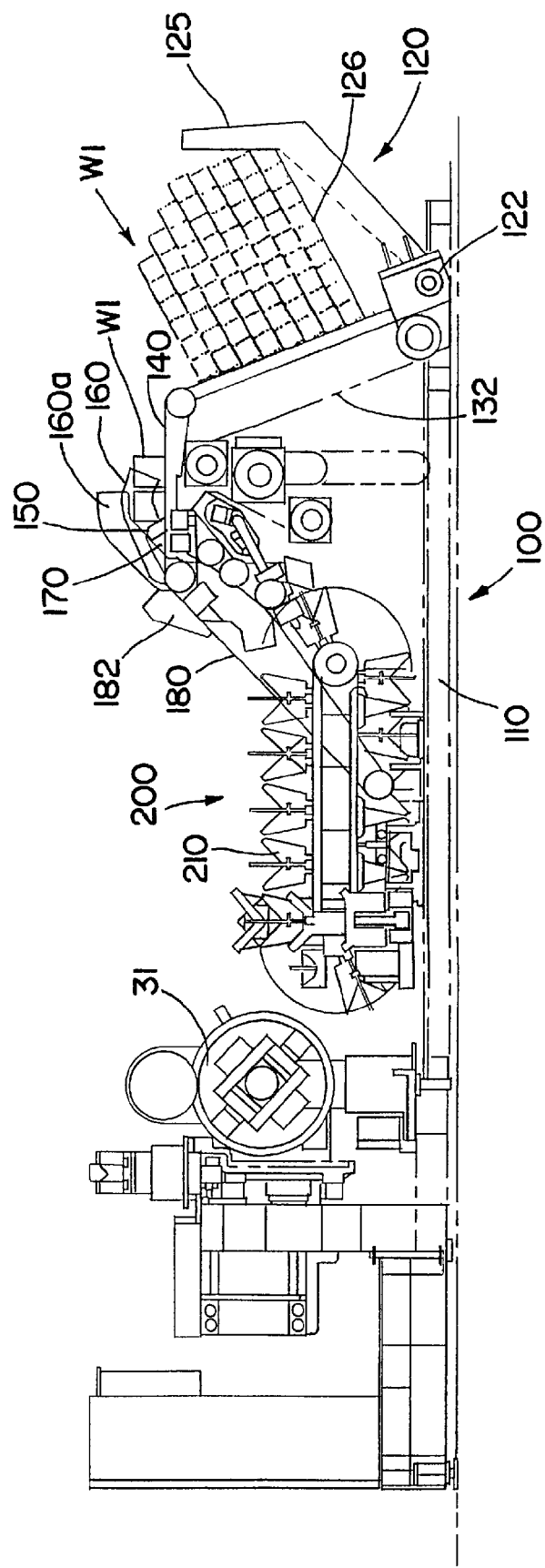
FIG. 3 is a front view of the automatic loading device for a large variety of materials.
Figure 4:
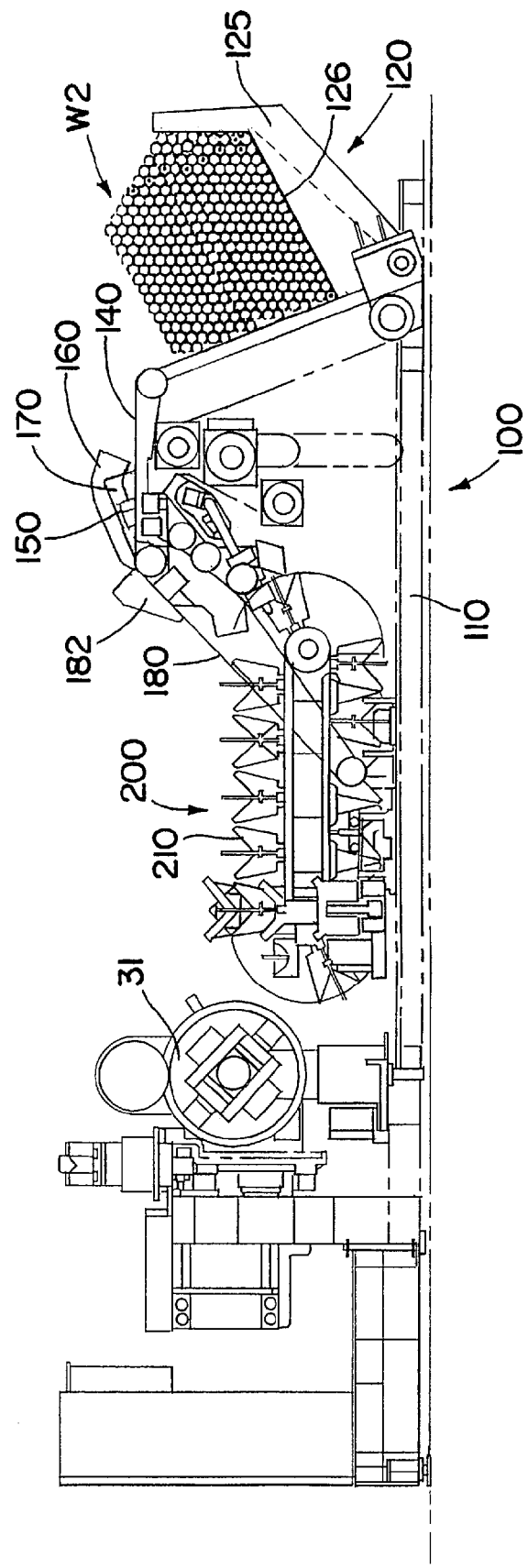
FIG. 4 is a front view of the automatic loading device for a large variety of materials.

FIG. 1 is a perspective view showing a general configuration of a three-dimensional laser beam machining apparatus provided with an automatic loading device for a large variety of materials in accordance with an embodiment of the present invention, FIG. 2 is a front view of the automatic loading device for a large variety of materials, and FIGS. 3 and 4 are front views of the automatic loading device for a large variety of materials in a supply state of materials.

A three-dimensional laser beam machining apparatus in accordance with an embodiment of the present invention, the whole of which is denoted by reference numeral 1, includes a long base 10 and guide rails 12 provided on the base 10.

In the central part of the base 10, a three-dimensional laser beam machine 20 is provided, and a laser machining head 21 performs three-dimensional laser beam machining on a workpiece held by a chuck 32.

On the guide rails 12 on the base 10, there are provided three chucks 31, 33, and 34, which are moved on the guide rails 12 by a driving unit. Since the three-dimensional laser beam machine 20 is also provided with the chuck 32, a total of four chucks handle a workpiece.

The three-dimensional laser beam machining apparatus 1 also includes equipment such as a laser oscillator 61, a chiller unit 62, an electrical unit 63, and a dust collector 64.

The three-dimensional laser beam machining apparatus 1 is provided with an automatic loading device 100 for a large variety of materials on the upstream side of the three-dimensional laser beam machine 20 and a unloading device 50 for machined workpieces on the downstream side thereof.

The unloading device 50 for workpiece, which is provided with a chain conveyor 52, receives a workpiece held by the chucks 33 and 34 from a transfer device 54 and conveys it to a discharge section.

On the upstream side of the three-dimensional laser beam machine 20, there is provided the automatic loading device 100 for a large variety of materials, which is capable of feeding long materials of both of a bundle type and a versatile type.

FIG. 2 is a front view of the automatic loading device 100 for a large variety of materials provided in the three-dimensional laser beam machining apparatus 1 in accordance with the present invention, the loading device being viewed from the three-dimensional laser beam machine side.

The automatic loading device 100 for a large variety of materials includes a bundle type material loading device 120 provided in an end part of a frame 110.

The bundle type material loading device 120 has a carriage 122 that moves on a guide rail 121 in the direction of the arrow A, and the carriage 122 is supported on the rail 121 by a roller 124.

The carriage 122 is provided with an arm 125 and a bottom plate 126, and bundle type materials $W_1$ are carried onto the bottom plate 126. The carriage 122 is connected to a chain 132, and the chain 132 is driven by a drive shaft 130.

When the carriage 122 moves up, the bundle type material $W_1$ is pushed out onto a roller conveyor 140 provided in the horizontal direction. The forefront of the material $W_1$ transferred by the roller conveyor 140 collides with a stopper 150. The position in the direction of the arrow B of the stopper 150 can be adjusted manually. The operator adjusts the position in the direction of the arrow B of the stopper 150 according to the kind and size of the material $W_1$.

Above the roller conveyor 140, a two-tier stack preventive stopper 160 is provided to prevent the material $W_1$ from being conveyed in a state of being stacked in two or more tiers. The two-tier stack preventive stopper 160 is rotatably supported by a drive shaft 162 and the height position of the tip end thereof can be adjusted according to the height dimension of the material $W_1$.

In the case where the material $W_1$ is a polygonal pipe as shown in FIG. 2, the position of the two-tier stack preventive stopper 160 is adjusted to a position denoted by reference numeral 160a, and the material $W_1$ is sent out to the stopper 150 side every one tier.

The front material $W_1$ colliding with the stopper 150 is raised by a swing arm 170, and gets over the upper end part of the stopper 150.

The material $W_1$ having passed through the upper part of the stopper 150 is stopped by a support member 182 attached to an inclined conveyor 180. The inclined conveyor 180 is moved in the direction of the arrow C by a drive shaft 184.

The material $W_1$ having been stopped by the support member 182 lowers slantwise downward along with the movement of the inclined conveyor 180, and is placed on a receiving member 210 of a common conveyor 200.

The common conveyor 200, which can handle both of the bundle type material and a versatile type material, conveys the material to the first chuck 31 side of the three-dimensional laser beam machining apparatus.

The front material is supplied to the first chuck 31 one by one by a traverser 250.

The above is equipment used when the bundle type materials $W_1$ are fed.

On the other hand, the versatile type material that must be supplied by being placed side by side so that the posture thereof around the axis line in the lengthwise direction is set on the receiving member 210 of the common conveyor 200 one by one by the operator so that the posture thereof is the same.

FIG. 3 is an explanatory view showing the case where polygonal pipe shaped bundle type materials $W_1$ are fed. The loading device is the same as that explained with reference to FIG. 2, so that the same reference numerals are applied to elements that are the same as those shown in FIG. 2, and the detailed explanation thereof is omitted.

FIG. 4 is an explanatory view showing the case where round pipe shaped bundle type materials $W_2$ are fed. The loading device is the same as that explained with reference to FIG. 2, so that the same reference numerals are applied to elements that are the same as those shown in FIG. 2, and the detailed explanation thereof is omitted.

What is claimed is:

1. A three-dimensional laser beam machining apparatus for a long workpiece, which performs three-dimensional laser beam machining on the long workpiece, comprising:
    a base disposed in the lengthwise direction;
    a three-dimensional laser beam machine disposed in the central part of the base;
    an automatic loading device for a large variety of materials;
    a common conveyer having a plurality of receiving members configured to move in a horizontal direction and configured to commonly convey a first type material supplied in a bundle form and having a cross-sectional shape such that the posture around the axis line is aligned automatically during the conveyance, and a second type material which has a cross-sectional shape such that the posture around the axis line is not aligned automatically during the conveyance; and
    an unloading device for unloading a machined workpiece; wherein
    the automatic loading device and the unloading device are disposed with the three-dimensional laser beam machine being held therebetween,
    the automatic loading device includes:
        a bundle type material loading device configured to load a plurality of the first type materials onto a conveyor included in the automatic loading device;
        the conveyor configured to send the plurality of first type materials in the horizontal direction to a stopper and through a two-tier stack preventive device, each included in the automatic loading device;
        the stopper configured to regulate the forefront position of the sent first type material;
        the two-tier stack preventive device disposed on the upstream side of the stopper to prevent the sent first type material from being stacked in two or more tiers;
        an adjuster configured to adjust a horizontal position of the stopper and a height position of the two-tier stack preventive device;
        a swing arm configured to send out a front one of the plurality of first type materials one by one over the stopper onto an inclined conveyor included in the automatic loading device; and the inclined conveyor configured to align two or more of the plurality of first type materials in a line and send the two or more first type materials to the common conveyor.

2. The three-dimensional laser beam machining apparatus for a long workpiece according to claim 1, wherein the first type material is a round pipe or a polygonal pipe.

3. The three-dimensional laser beam machining apparatus for a long workpiece according to claim 1, further comprising a first rotary chuck provided in the three-dimensional laser beam machine and a second rotary chuck which is disposed on the feed side to hold the long material, and still further comprises a driving unit for driving the second rotary chuck and two third rotary chucks, which are disposed on the delivery side, in the axis line direction.

* * * * *